United States Patent [19]

Stevenson

[11] 4,066,358
[45] Jan. 3, 1978

[54] PHOTOCOPY MACHINE

[76] Inventor: Arzella F. Stevenson, 50 Oswego Place, North Babylon, N.Y. 11703

[21] Appl. No.: 706,159

[22] Filed: July 19, 1976

[51] Int. Cl.² .................. A47B 27/04; G03B 27/62
[52] U.S. Cl. ........................................ 355/75; 312/233
[58] Field of Search ................ 355/75, 77, 25, 82; 312/233, 281, 111; 248/243, 295; 2/249; 211/105.1; 24/11 CT

[56] References Cited

U.S. PATENT DOCUMENTS

| 739,730 | 9/1903 | Sholty | 312/233 X |
|---|---|---|---|
| 1,702,494 | 2/1929 | Caps | 355/25 |
| 1,766,162 | 6/1930 | Young | 248/295 X |
| 2,089,999 | 8/1937 | Greene | 312/281 X |
| 2,613,413 | 10/1952 | Budny | 24/11 CT X |
| 2,651,489 | 9/1953 | Bell | 248/295 X |
| 2,662,637 | 12/1953 | Armbruster | 24/11 CT UX |
| 3,078,484 | 2/1963 | Briggs | 248/295 X |
| 3,399,940 | 9/1968 | Yang et al. | 312/233 |
| 3,953,092 | 4/1976 | Cronan et al. | 312/233 |

Primary Examiner—Donald Griffin
Attorney, Agent, or Firm—Allen D. Brufsky

[57] ABSTRACT

A book copier attachment for a copy machine supports a plurality of books which are to be copied. The device comprises a support frame removably mounted on a copy machine. A platform for holding the book is hingeably joined to the support frame. A paper holding element is removably mounted on the support frame. A clip board is removably mounted to the paper holding element.

5 Claims, 7 Drawing Figures

U.S. Patent    Jan. 3, 1978    4,066,358
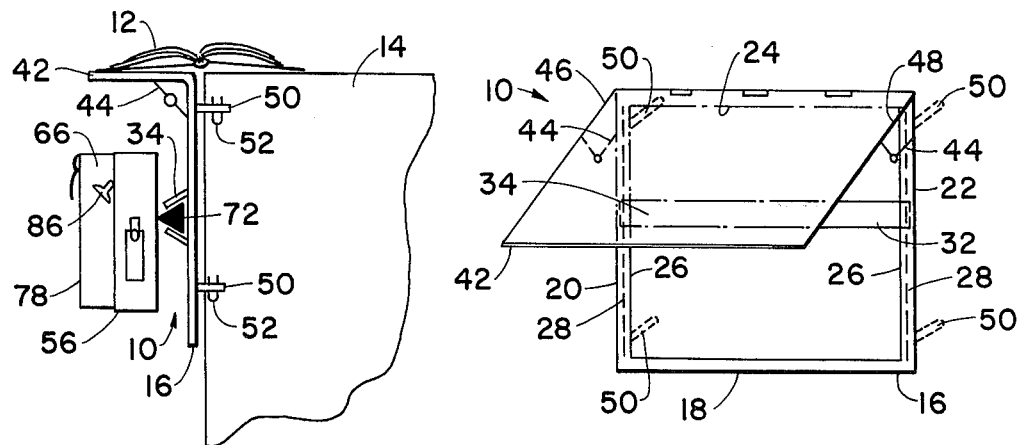
FIG. 1    FIG. 2
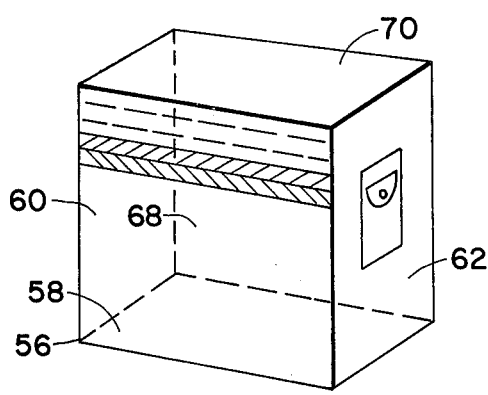    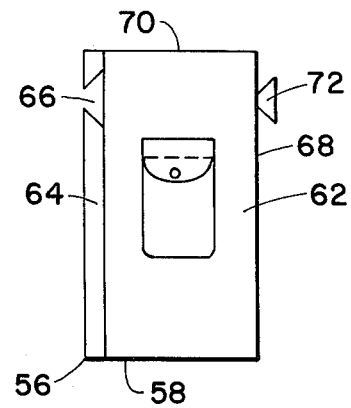    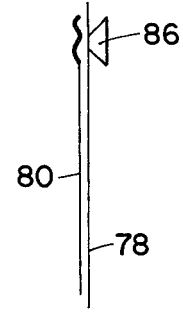
FIG. 3    FIG. 4    FIG. 5
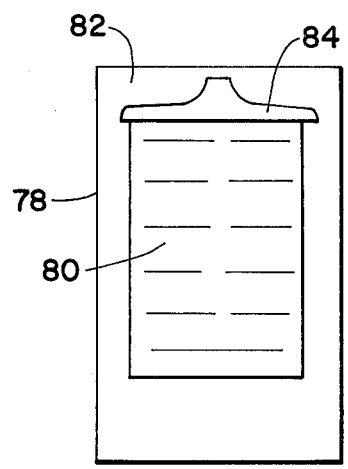    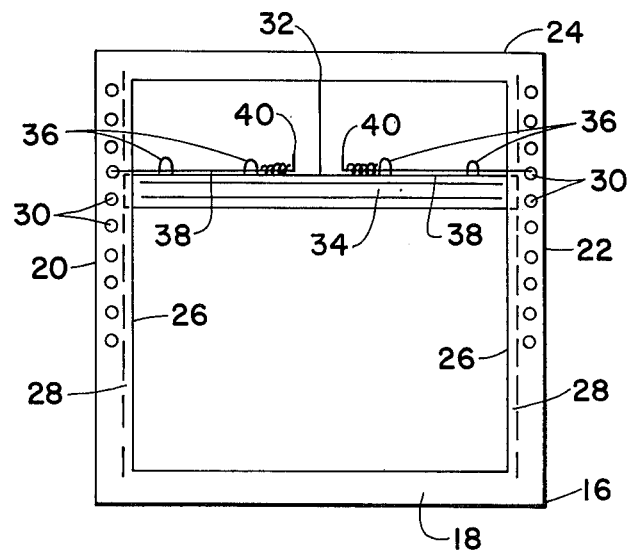
FIG. 6    FIG. 7

PHOTOCOPY MACHINE

BACKGROUND OF THE INVENTION

A major problem existing in the art of copying printed material is an adequate means for supporting a plurality of books which are to be copied by providing more table area. The present invention provides a support means for a plurality of books not being copied but to be copied later.

A number of U.S. patents relate to attachment devices for copying machines. These patents are: U.S. Pat. No. 3,181,448 to Hemenway; U.S. Pat. No. 3,588,244 to Murgas, et al.; and U.S. Pat. No. 3,635,557 to Alderton. These aforementioned patents are non-applicable to my present invention.

SUMMARY OF THE INVENTION

My present invention relates to a unique and novel attachment device for a copy machine for supporting a plurality of books to be copied later.

An object of my present invention is to provide an attachment device for a copy machine which is capable of supporting a plurality of books to be copied later.

A further object of my present invention is to provide a device of simple design which is removably mounted onto the copy machine.

A further object of my present invention is to provide a paper holding element which is removably mounted onto a frame of the device, wherein the paper holder element receives copy paper therein for storage purposes.

A still further object of my present invention is to provide a clip board which is removably mounted onto the paper holding element, wherein the clip board is used to hold a log record of the number of copies made on the copy machine.

Briefly, my present invention comprises a support frame which is removably secured to a copy machine. A platform is hingably joined to the support frame. A paper holding element is removably mounted onto a cross bar member which is slidably disposed within the support frame. A clip board is removably mounted onto the paper holding element.

BRIEF DESCRIPTION OF THE DRAWINGS

The objects and features of the invention may be understood with reference to the following detailed description of an illustrative embodiment of the invention, taken together with the accompanying drawings in which:

FIG. 1 shows a side view of a book copier attachment device removably affixed on a copy machine FIG. 2 illustrates a front perspective cross-sectional view of the device;

FIG. 3 illustrates a perspective cross-sectional view of a paper holder element of the device FIG. 4 illustrates a side view of the paper holder element;

FIG. 5 illustrates a side view of a clip board of the device;

FIG. 6 illustrates a front view of the clip board; and

FIG. 7 illustrates a front cross-sectional view of the frame of the device.

DESCRIPTION OF THE PREFERRED EMBODIMENT

Turning now descriptively to the drawings, in which similar reference characters denote similar elements throughout the several views, FIGS. 1-2 show a book copier attachment device 10 adapted to support a plurality of books 12 to be copied later, wherein the device 10 is removably affixed to a copy machine 14. The device 10 comprises a rectangularly shaped frame 16 having a base 18, a pair of sides 20, 22, and a top 24. The inner edge 26 of each side 20, 22 has an elongated slotted groove 28 therein, wherein each groove 28 has a row of inwardly extending apertures 30. The ends of an elongated bar member 32 are slidably disposed in the grooves 28 of the two sides 20, 22 as depicted in FIG. 7. A dove tailed shaped channel member 34 is mounted on the front face of member 32. A plurality of sleeve members 36 are affixed onto the upper edge of member 32. A pair of spring loaded rod members 38 are slidably contained with members 36, wherein one end of each rod member 38 is removably received into the apertures 30 disposed within the sides 20, 22. The inner end of each rod member 38 has a finger grip element 40 disposed thereon. When the elements 40 of the two rod members 38 are pressed together, the ends of the rod members 38 are retracted from the apertures 30 allowing the bar member 32 to be moved up and down within the frame 16. A rectangularly shaped platform member 42 is hingably joined to an upper edge of top 24, wherein the upper surface of member 42 is adapted to receive a portion of the book 12. A center pivoted two sectional hinge member 44 is joined between each side 20, 22 of the frame 16 and each side 46, 48 of the member 42.

A plurality of small flat bar members 50 are affixed perpendicularly to each side 20, 22 of frame 16, wherein members 50 extend rearwardly of frame 16.

A plurality of U-shaped clamp members 52 are affixed onto each side of the copy machine 54, wherein each clamp member 52 removably receives a member 50 therein for supporting the frame 16 of the device 10 in a vertical plane in front of the front wall of the copy machine 54.

FIGS. 1, 3 and 4 show a paper holder element 58 removably secured to the frame 16. The section 56 comprises a base 58, a pair of upwardly extending sidewalls 60, 62, an upwardly extending front wall 64 having a laterally aligned, dove tailed shaped groove 66 therein, an upwardly extending rear wall 68, and an open top 70. A dove-tailed shaped bar element 72 is secured to the rear wall 68, wherein element 72 is removably received into member 34 for hanging element 56 in a vertical plane. A pocket member 74 with snap flap 76 is mounted on one sidewall 62, wherein member 74 is adapted to receive pencils or pens therein.

FIGS. 5 and 6 show a clip board 78 adapted to removably receive paper 80 therein for recording a record of the number of copies made. The clip board 78 is formed from a rectangularly shaped board element 82 having a clip element 84 affixed to the front face of the element 82. A dove tailed shaped bar member 86 is laterally mounted on the rear surface of element 82, wherein member 86 is removably received into groove 66 thereby hanging clip board 78 in a vertical plane.

Since obvious changes may be made in the specific embodiment of the invention described herein, such modifications being within the spirit and scope of the invention claimed, it is indicated that all matter contained herein is intended as illustrative and not as limiting in scope.

I claim:

1. An attachment device for a book copier adapted to be removably received on said copier comprising:
   a substantially rectangular support frame having a pair of opposed sides joined by a spaced top and base member,
   a platform,
   hinge means for pivotably joining said platform to the top member of said support frame, said hinge means including
   means for locking said platform in a substantially perpendicular position relative to said support frame to hold and support a book to be copied,
   a slot formed in the opposed sides of said support frame,
   an elongated bar member spanning the distance between said sides of said support frame and having an opposed end slidably mounted within each of said slots,
   means on said bar member cooperating with said sides of said support frame for retaining said bar member in a vertically adjusted position in said slots,
   mounting means extending rearwardly from one surface of each of said sides of said support frame for attaching said support frame to a book copier,
   dove-tail slot means formed in said bar member opening in a forward direction opposed to the direction of extension of said mounting means,
   a paper holder receptacle having an open top adapted to receive copy paper therein, and
   a dove-tailed shaped bar element secured to a rear wall of said receptacle removably received within the dove-tail slot means in said bar member.

2. A device according to claim 1, further comprising a clip board and a means for removably affixing said clip board to said paper holder element.

3. A device according to claim 2, wherein said removably affixing means further comprises a dove tailed shaped groove disposed in a front wall of said paper holder element and a dove tailed shaped bar member mounted on said clip bar, said dove tailed shaped bar member removably received into said dove tailed shaped groove.

4. A device according to claim 3, further comprising a pocket member mounted on said paper holder element.

5. A device in accordance with claim 1 wherein said mounting means includes a flat bar member affixed to each of said sides of said support frame adapted to be received within a bracket on a book copier.

* * * * *